(12) United States Patent
Liu

(10) Patent No.: US 6,572,243 B2
(45) Date of Patent: Jun. 3, 2003

(54) ROPE LIGHT STRUCTURE

(76) Inventor: Tzu-Chen Liu, P.O. Box No.6-57, Chung-Ho City, Taipei Hsien 235 (TW)

( * ) Notice: Subject to any disclaimer, the term of this patent is extended or adjusted under 35 U.S.C. 154(b) by 22 days.

(21) Appl. No.: 09/864,381

(22) Filed: May 25, 2001

(65) Prior Publication Data

US 2002/0176249 A1 Nov. 28, 2002

(51) Int. Cl.[7] .................................................. F21S 4/00
(52) U.S. Cl. .................... 362/249; 428/36.91; 362/218; 362/223
(58) Field of Search ............................. 428/99, 36.91; 362/249, 382, 218, 223

(56) References Cited

U.S. PATENT DOCUMENTS 5,410,458 A * 4/1995 Bell ............................ 362/219
6,179,440 B1 * 1/2001 Palmer ....................... 362/249

* cited by examiner

*Primary Examiner*—Alexander S. Thomas
(74) *Attorney, Agent, or Firm*—Troxell Law Office PLLC

(57) ABSTRACT

The present invention is a rope light structure, wherein several sets of light bulbs in series connection are disposed inside the hollow area of a transparent inner layer of polyvinyl chloride (PVC hereafter), the positive and negative pole terminals of the said several sets of light bulbs are connected in parallel with two core wires on two sides, an inner edge of transparent inner PVC layer is mounted with several arcuations, an outer layer thereof is covered by a transparent outer PVC layer disposed with several arcuations, thereby several arcuations are formed between the inner and the outer layers to define heat sink space for the light bulbs to facilitate the heat dissipation of the light bulbs so as to increase useful life of the light bulbs, to augment the brightness of the rope light so as to make multiple variations of refracting light.

1 Claim, 5 Drawing Sheets

ROPE LIGHT STRUCTURE

BACKGROUND OF THE INVENTION

1. Field of the Invention

The present invention relates to a rope light structure, more especially, a structure capable of saving the consumption of polyvinyl chloride (PVC hereafter) raw material, increasing useful life of the light bulbs, augmenting the intensity of the light to create multiple variations of refracting light and the flexibility of the entire mold to make the present invention in use safe and convenient thereby to achieve the effectiveness of more economic practicability.

2. Description of the Prior Art

Accordingly, a conventional rope light structure, as shown in FIG. 1, has the positive and a negative pole terminals of several sets of light bulbs (1) connected in parallel with two core wires (2) on two sides, then the core wires (2) on two sides are covered by an inner PVC layer (3), the said several sets of light bulbs (1) are tightly attached and disposed at the hollow area of the inner PVC layer (3), the outside of the said inner PVC layer (3) is further covered by an outer PVC layer (4) to be sealed into one unit; when using the rope light, a plug connected to one end of the core wires (2) is plugged into the power source for lightening up several sets of light bulbs (1) inside the light rope for the purpose of decorative or guiding illumination and others.

Based on the foregoing section, although the conventional rope light structure can fulfill the effectiveness of decorative or guiding illumination and others, it still has the following shortcomings:

1. Since several light bulbs are tightly attached and disposed inside the inner PVC layer, that will cause the insufficient heat dissipation of the light bulbs, after a long time of using, the PVC might melt and decompose to cause the short-circuit of the light bulbs and danger.
2. The insufficient heat dissipation of the light bulbs might cause overheat and interrupt the tungsten filaments of the light bulbs, thereby reduce useful life of the light bulbs.
3. Since the inner and the outer PVC layers are sealed unitarily, that will make the transparent bottom not preferable; the threads are disposed for improving flexibility, however, under the influence of the thickness of PVC, it is hard to bend when the bending angle is less than 90 degree and that will effect the disposal of the entire mode.

Therefore, in view of the mentioned shortcomings and inconvenience of the conventional rope light structure, the inventor of the present invention, based on the spirit of searching for innovation and the best, utilized the professional perspective and knowledge, researched a rope light structure being more practical with wider application range and complying with the industrially utilizable value.

SUMMARY OF THE INVENTION

The present invention mainly comprises of several arcuations disposed on an inner edge of a hollow area of an inner PVC layer to form heat sink space provided for dissipating the heat of the light bulbs, several arcuations are disposed between an inner and an outer PVC layers for augmenting the brightness of the light bulbs to create multiple variations of refracting light.

The primary objective of the present invention is to utilize several arcuate designs on the inner edge at the hollow area of the inner PVC layer to provide easy heat dissipation for the light bulbs and enable easy moving, not to cause the connected guide wire to break easily but to increase useful life of the light bulbs.

Another objective of the present invention is to utilize several arcuate designs between the inner and the outer PVC layers to make the transparent bottom of the inner and outer PVC layer more preferable to enable the brightness of the light bulbs to create multiple variations of the refracting light to penetrate through the inner and the outer PVC for brighter illumination.

Yet another objective of the present invention is to utilize several arcuate designs on the inner edge at the hollow area of the inner PVC layer as well as between the inner and the outer PVC layers to make the PVC flexible thereby to facilitate the disposal of the entire mode and to save the consumption of PVC raw material.

To enable a further understanding of the objectives, the features and the functions of the present invention, the brief description of the drawings below is followed by the detailed description of a preferred embodiment.

DETAILED DESCRIPTION OF THE PREFERRED EMBODIMENTS

Figure 1:
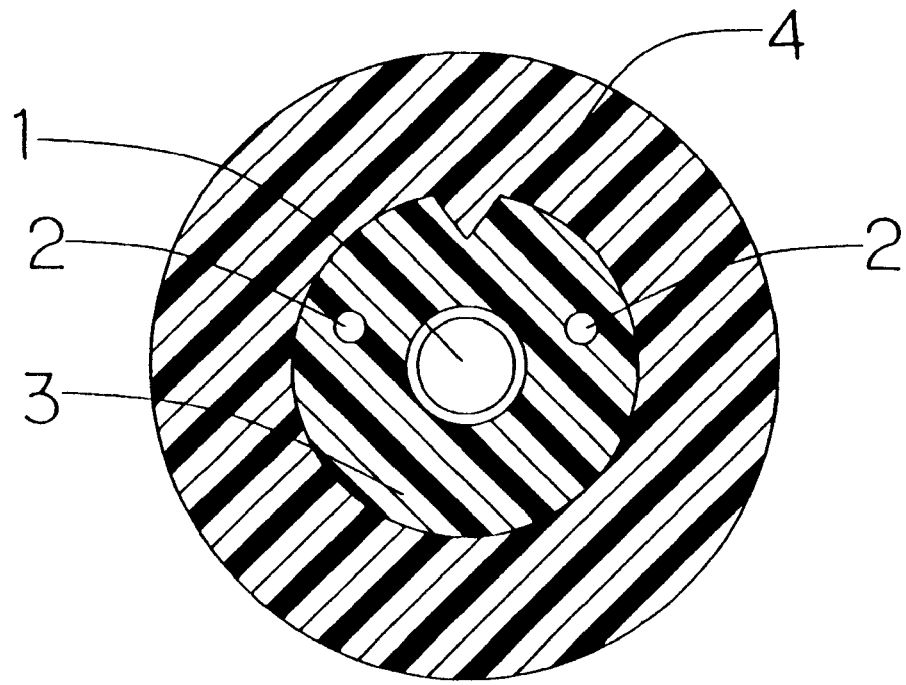
FIG. 1 is a bird's-eye, cross-sectional and schematic drawing of a conventional structure.
Figure 2:
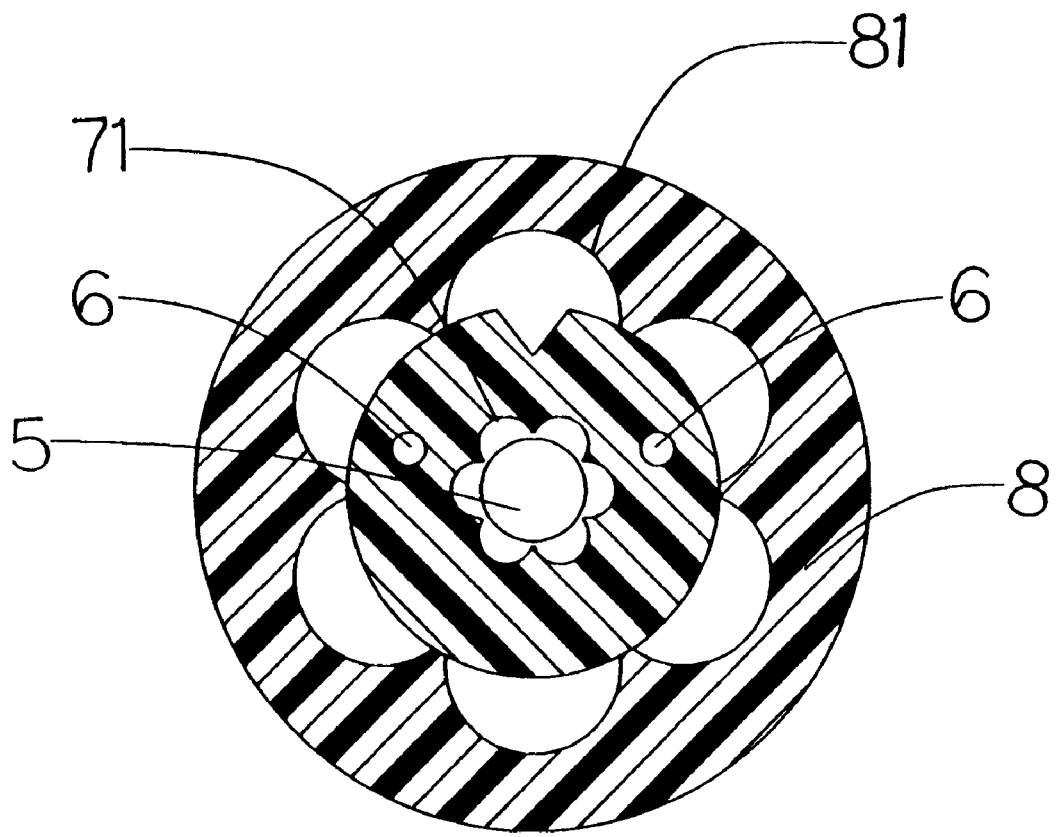
FIG. 2 is a bird's-eye, cross-sectional and schematic drawing of the present invention.
Figure 3:
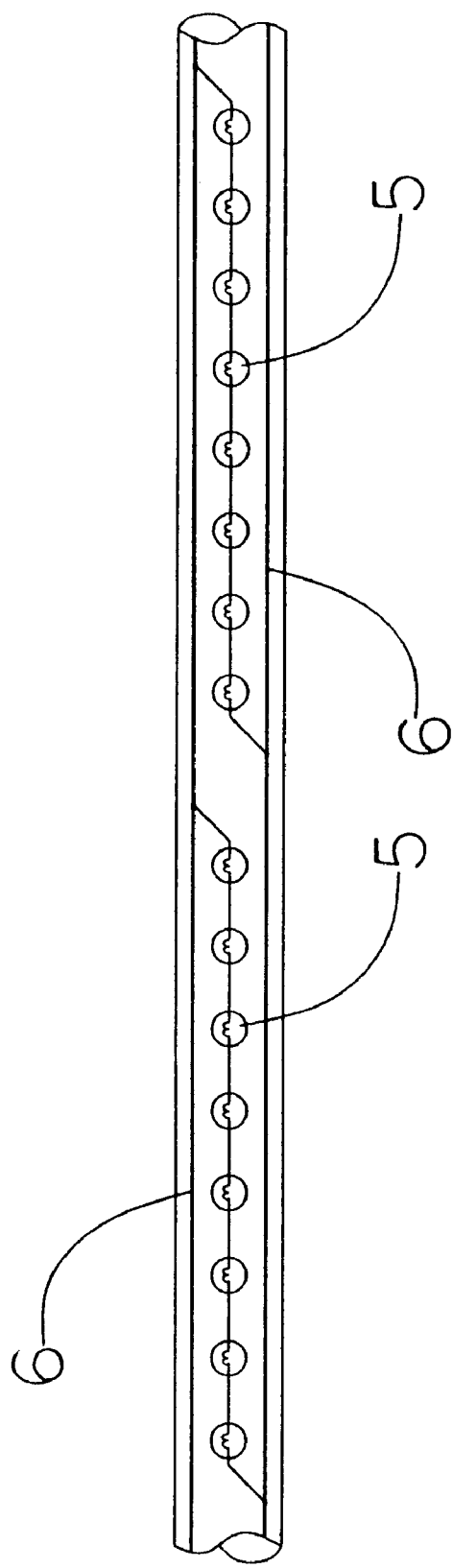
FIG. 3 is a schematic drawing of the connected light bulb sets of the present invention.

Referring to FIGS. 2 and 3, the bird's-eye, cross-sectional and schematic drawing, and the schematic drawing of the connected light bulb sets of the present invention, the present invention to be used for the effectiveness of decorative or guiding illumination and others is comprised by connecting several light bulbs in series to form light bulb sets (5), the positive and negative pole terminals of several light bulb sets (5) are connected to the core wires (6) on two sides, then the core wires (6) on two sides are covered by an inner PVC layer (7), several light bulb sets (5) are disposed at the hollow area of the inner PVC layer (7), the outside of the said inner PVC layer (7) is further covered by an outer PVC layer (8); the features of the present invention are that several arcuations (71) are disposed on the inner edge at the hollow area of the said inner PVC layer (7) to form heat sink space to provide easy heat dissipation for the light bulbs without causing the danger due to the melting and decomposing of PVC after long term of usage because insufficient heat dissipation and the short-circuit of the light bulbs to avoid the interruption of the tungsten filaments of the light bulbs due to overheat of the light bulbs so as to increase useful life of the light bulb sets (5); several arcuations are disposed between the said inner PVC layer (7) and the said outer PVC layer (8) to enable the light to create multiple variations of refracting light through several arcuations (81), to penetrate through the inner and the outer PVC layers (7, 8) for brighter illumination and increasing the brightness of the rope light.

Figure 4:
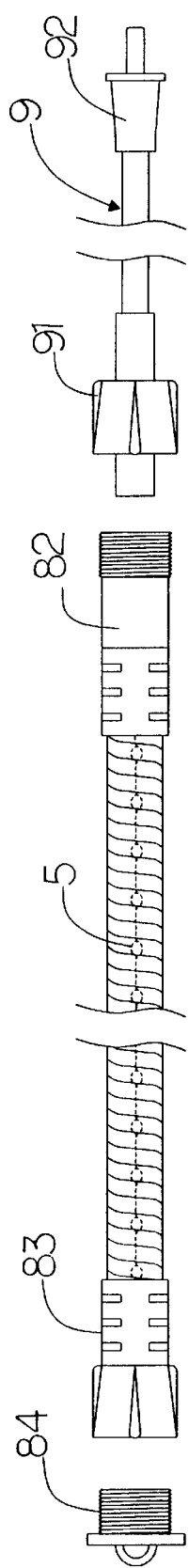
FIG. 4 is a schematic drawing of the actual connection of the rope light of the present invention.
Figure 5:
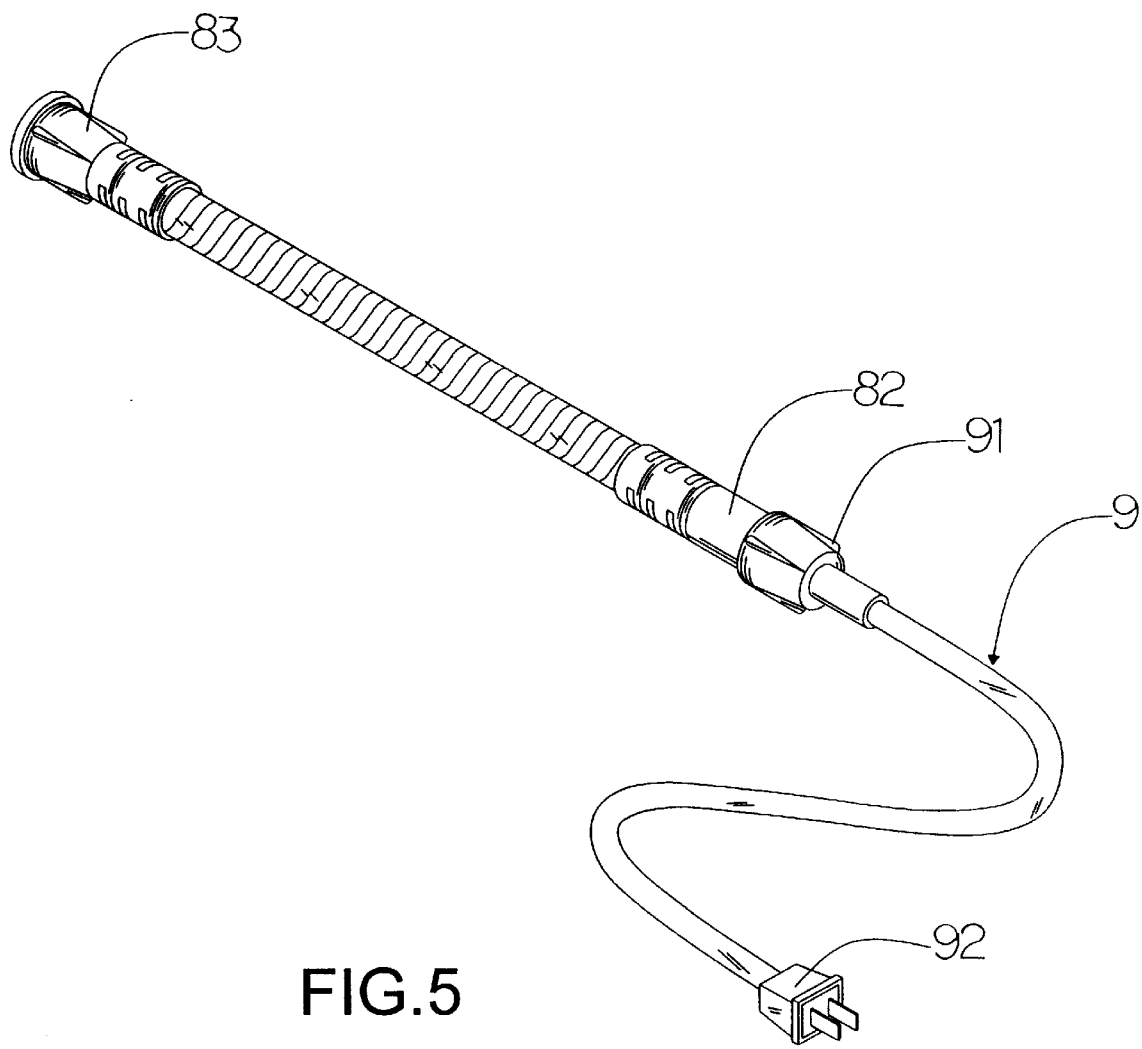
FIG. 5 is a schematic drawing of the actual assembly of the rope light of the present invention.

When the present invention is in use, as shown in FIGS. 4 and 5, the rope light can be cut to the desired length, then the two ends of the rope light will be engaged respectively with a positive joint (82) and a negative joint (83); the positive joint (82) connects with the power line joint (91), the negative joint (83) connects with another rope light; when the present invention is not in use, a waterproof lid (84) tightly covers over the negative joint (83); finally, the plug (92) on the other end of the power line (9) is plugged with the power source; at this time, the space design of several arcuations (71, 81) makes the transparency of the inner and the outer PVC layers (7, 8) more preferable and augments the brightness of the light bulb sets (5); through several arcutations (81), the light creates multiple variations of refracting light capable of penetrating through the inner and the outer PVC layers (7, 8) and illuminating brighter; when not in use, the power line plug (92) can be unplugged.

Based on the mentioned, the present invention of the rope light possesses the following advantages:

1. The light intensity can be augmented to create multiple variations of refracting light due to the space design of several arcuations (71, 81) of the inner and the outer PVC layers (7, 8) of the present invention.
2. The heat dissipation of the light bulb sets (5) becomes easier and useful life of the light bulb is increased due to the space design of several arcuations (71, 81) of the inner and the outer PVC layers (7, 8) of the present invention.
3. The PVC becomes more flexible so as to facilitate the disposal of the entire mold and the consumption of PVC raw material is reduced due to the space design of several arcuations (71, 81) of the inner and the outer PVC layers (7, 8) of the present invention.
4. The material used for making the present invention is lighter and the temperature thereof is lower, that makes the present invention in use possess more safety and convenience.

In summation of the foregoing sections, the present invention of a rope light structure truly possesses more effectiveness of economic practicability than the conventional rope light structure, has innovation and advancement, complies with all new patent application requirements and is hereby submitted lawfully to the patent bureau for review and the granting for the commensurate patent rights.

The forgoing disclosed illustrations and descriptions are merely for one of the exemplary embodiments of the present invention and are not to be construed as limiting the actual implementary range of the present invention; any alternation based on the features and the functions indicated in the above descriptions and the following claim application scope should be included in the patent scope of the present invention.

What is claimed is:

1. A rope light structure comprising a plurality of light bulbs connected in series to form light bulb sets, positive and negative pole terminals of the light bulb sets are connected in parallel to core wires on two sides, the core wires on two sides being covered by an inner PVC layer, the light bulbs sets disposed at a hollow area of the inner PVC layer, an outside of the inner PVC layer is further covered by an outer PVC layer; a plurality of first arcuations disposed on an inner edge at the hollow area of the inner PVC layer to form heat sink spaces to increase a useful life of the light bulb sets; and, a plurality of second arcuations disposed between the inner PVC layer and the outer PVC layer to augment a brightness of the rope light to thereby create multiple variations of retracting light, to facilitate heat dissipation and to increase the useful life of the light bulbs.

* * * * *